United States Patent [19]

Cuevas

[11] Patent Number: 5,160,230
[45] Date of Patent: Nov. 3, 1992

[54] SAFETY DEBRIS CATCHER

[76] Inventor: Laverne F. Cuevas, P.O. Box 479, Long Beach, Miss. 39560

[21] Appl. No.: 755,612

[22] Filed: Sep. 5, 1991

[51] Int. Cl.⁵ .............................................. B23B 45/00
[52] U.S. Cl. .................................... 408/67; 408/72 R
[58] Field of Search .................. 408/67, 72 R, 241 R, 408/241 G; 175/211

[56] References Cited

U.S. PATENT DOCUMENTS

| | | | |
|---|---|---|---|
| 3,339,435 | 9/1967 | Heitz | 408/67 |
| 3,583,821 | 6/1971 | Shaub | 408/72 R |
| 3,936,213 | 2/1976 | Kappel | 408/67 |
| 4,955,984 | 9/1990 | Cuevas | 408/67 |

FOREIGN PATENT DOCUMENTS

| | | | |
|---|---|---|---|
| 3140776 | 4/1983 | Fed. Rep. of Germany | 408/67 |
| 1593143 | 7/1981 | United Kingdom | 408/67 |

*Primary Examiner*—Daniel W. Howell
*Attorney, Agent, or Firm*—Alexander F. Norcross

[57] ABSTRACT

Disclosed are safety debris collectors for collecting dust and debris, such as concrete particles and dust, rock chips, steel particles, radioactive particles, insulation and other particles and dust when drilling, chipping and using stud guns, drills, piston drive devices and other operating tools used in the construction industry which create working dust or debris and the like. The safety debris catcher does not rotate or move with the operating portion of the tool, it is easily and readily connected to and detached from an operating tool or device, it can be used in confined spaces, such as spaces between beams, braces, and ceilings at different elevations, and it can be used at any angle and effectively collect debris, dust and other particles. A rotating inner disk within the base of the debris catcher forms a rotating inner surface of a chip chamber, urging debris away form the tool into a debris receiving chamber.

6 Claims, 1 Drawing Sheet

SAFETY DEBRIS CATCHER

BACKGROUND OF THE INVENTION

In the construction of buildings and houses, a considerable amount of drilling and chipping occurs, together with extensive use of stud guns and similar particle creating tools. All such work and use of such tools results in the creation of debris and dust, largely consisting of concrete dust, chips, shavings, steel particles, and the like, produced as a drill, chisel or stud engages a surface of a ceiling, wall, floor or construction member, including steel reinforcement rods or wires. In addition certain construction tasks prodict debris of a particularly harmful nature. For example, in nuclear plants, particles of radioactive material may be given off; in working on older buildings, hazardous materials, such as asbestos dusts, may be released.

A number of debris catchers have been proposed in order to prevent the dust, chips, shavings, particles, and the like from falling in the face, eyes, etc., of the workers, to lessen debris, dust and the like in offices or buildings which are occupied or have equipment in them; to keep the work area cleaner and safer and to expand the life expectancy of the operating tool by preventing debris from contaminating it.

My prior U.S. Pat. No. 4,955,984, issued Sep. 11, 1990, summarizes the known art in this field, and discloses a debris catcher to reduce or contain the release of such dusts and debris. Experience in using such a debris catcher has identified several significant improvements which would enhance the safe use of tools under such circumstances.

SUMMARY OF THE INVENTION

The present invention is directed to an improved safety debris catcher in which the catcher is readily and quickly mounted to the operating tool so that the catcher is connected to but does not rotate or move with the operating portion of the tool, such as the drill, chisel, recoil barrel of a stud gun, and the like. The catcher has a resilient, compressible bellows portion surrounding the operating part of the tool, which can be ccommmpressed so that the debris catcher is below the operating end of the tool if such should be required, as, for example, in the use of a stud gun for shooting fastenings into a surface or suport. The tool has also a removable collector or catcher portion at its outer end, which extends beyond the working component of the tool to a distance sufficient so that it will non-rotatably seat against a wall, ceiling, floor, or other surface. The collector effectively collects and/or confines debris when used at any angle, and which does not create additional debris while in use, in contrast to catchers or collectors rotating against a working surface.

The invention is an improved safety debris catcher with a dust and debris collection chamber having an interior rotating disk captive within an outer fixed chamber, to remove and hold captive debris from the vicinity of the tool's working or rotating components.

I also disclose a preferred assembly of the improved debris catcher from components so that a single sized set of components may be assembled to fit a wide range of tools.

It is therefore an object of the present invention to provide a safety debris collector which can readily and easily be attached to an operating tool or device, such as a drill, hammer drill, stud gun, and the like, that does not move with the operating part of the tool so that it can be non-rotatably and non-movably seated against a wall, ceiling, or floor, and which can be used in confined spaces, such as spaces between beams and braces, and with ceilings at different elevations, to collect working debris and dust and prevent them from falling on the operator, the tool, the area or premises where it is used, or on any occupants, machinery or furniture in the premises.

It is a further object of the present invention to provide such a safety debris catcher which can be used at any angle and which effectively collects and confines debris when in use.

A further object of the present invention is the provision of such a safety debris collector which is relatively simple, inexpensive, effectively collects debris in use, and which is readily, easily, and quickly attached to or disconnected from various differing sizes of operating tools.

Other and further objects and features of the invention appear throughout the specification and claims and are inherent therein.

DETAILED DESCRIPTION OF THE PREFERRED EMBODIMENT

This invention is an improvement of my previously patented Debris catcher, described in U.S. Pat. No. 4,955,984, which is incorporated herein by reference in full.

Figure 2:
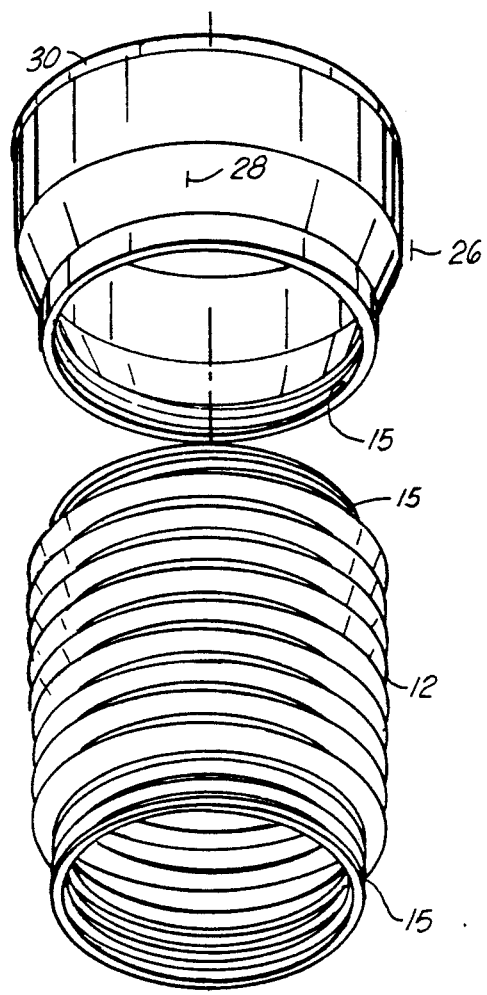
FIG. 2 is an exploded view of the inventive chip chamber of the invention.
Figure 2:
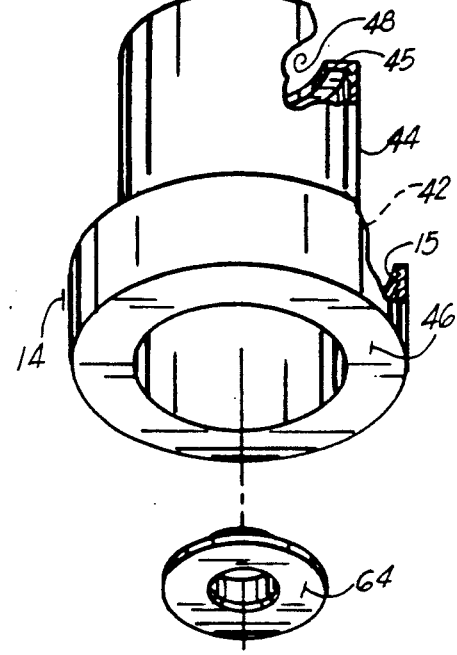
Figure 1:
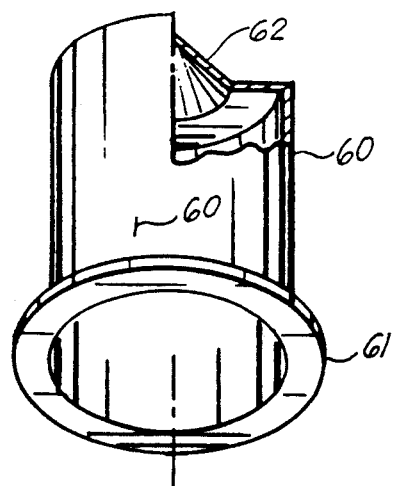
FIG. 1 is an inverted view of a safety dust or debris catcher according to the present invention.
Figure 1:
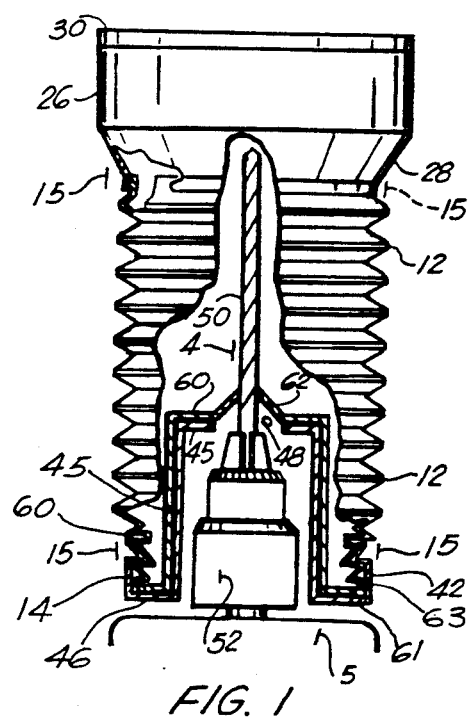

Referring to the drawings and particularly FIG. 1, my improved Safety Debris Catcher is generally indicated by the reference number 10. It includes as its principal structure, a resilient, compressible sleeve-like bellows 12, which is generally tubular in shape and extends a distance forming the major portion of the safety debris catcher 10. At an operational end, for insertion of a powered rotary tool 5 is a tailpiece 14, fixed to the bottom of the bellows 12, of generally tubular configuration sized to fit over the rotary tool and chuck of the operating tool 5, here shown as a typical electric drill. For generality, I refer to the rotating parts of the tool 5 as the working component 4, to distinguish the moving components of a powered tool 5 from the fixed portion which is hand held. In the specific embodiment chosen to illustrate my invention, working component 4 is the chuck and drill bit 50 of a rotary drill.

The outer or upper end of the sleeve like bellow portion 12 is connected to a debris collector 26 which extends outwardly a relatively short distance from the bellow sleeve portion 12 and, preferably, is generally tubular in shape, having an outwardly tapered portion 28 necking down to connect to the bellows portion 12. Both the debris collector 26 and the bellows portion 12 are made of a resilient type material. While the debris collector 26 can take a variety of shapes, it should have a seating surface 30 which extends outwardly a relatively short distance from the outer surface of the bellow sleeve 12 so that the debris catcher 10 may be seated against a surface in a confined space. For example, it is preferred that debris collector 26 should not extend outwardly a distance greater than twice the diameter of the bellow sleeve portion 12.

Seating surface 30 is preferably an inverted edge made of a softer material such as a neoprene rubber, extending a distance, for example ⅜ to ½ inches, to form a seal for hazardous material capture. Such a seating surface 30 provides better sealing against escape of fines and dusts.

The above listed parts of the safety debris catcher can be formed as a unitary unit, by molding, injection molding or the like. In the best mode, however, they are made as separate molded plastic units of a standard size, having threaded ends 15 so that they can be screwed together to assemble a debris catcher 10 of desired length, depending on the length of the working component 4. The components of the invention can equally be releasably secured together by any suitable means, such as threading, threading and gluing, or a slip fit secured with glue, rivets, plastic welding or the like.

The preferred connection 15 is by a molded "J-thread", a known thread type that is angled in aspect, having one face at a flatter angle than the other. Such a thread, in a plastic device, tends to snap together under pressure, but strongly resists pulling apart. Each component of the invention is made of a uniform diameter at the ends thereof, and each of the bellows 12, debris collector 26, and the tailpiece 14 are constructed with matching, mating threaded ends 15 for assembly. As a result, a given debris catcher 10 may be assembled of the components to produce a debris catcher 10 sized for any of a wide range of types and sizes of tools 5. For example, it is advantageous in a stud gun to assemble a debris catcher without a collector 26, so that the bellows 12 may be pulled down to expose the operating end of the gun; when the gun is positioned, the bellows, being released, shrouds the operating end. Since a stud gun produces a shower of particles in a single pulse at each shot, this is sufficient to capture all debris and reduce operator discomfort. In contrast, an extra long debris catcher 10 may be assembled by screwing together a number of bellows sections 12, as would be required for extra long drill bits such as are used for cable installation in existing structures.

All portions of the safety debris catcher 10 except the sealing surface 30 may be made out of any suitable resilient material which will permit the bellows portion 12 to compress actually when in use. Any of the injection molded plastics, especially the urethanes, are suitable.

It is preferable that the sealing surface 30 material be such as to provide a seal when the seating surface 30 is seated against a surface. As stated above, the best material is a neoprene rubber, Suitable resilient materials include various plastics, clear and acid resistant rubber, or the like which are readily available upon the market.

Referring to FIG. 1, the safety debris catcher 10 is illustrated connected to a drill 5. It is desirable that the safety debris catcher 10 not rotate, yet it must interconnect with the tool 5 so as to seal off the tool working component 4. Chip chamber 40 should provide for clearing chips, dusts and debris away from the working component 4 of the tool 5.

To accomplish this, I show an improved rotor chip chamber 40 formed within a tailpiece 14. Chip chamber 40 is formed within outer tail piece 14, which is attached to the lower end of bellows 12. Tail piece 14 is formed as a tubular chamber extending down, surrounding the chuck 51 of the drill 5. Tailpiece 14 has concentric outer tubular wall 42 co-axial with inner tubular wall 44. Outer tubular wall 42 and inner tubular wall 44 are joined at a lower closed end by a base disk 46.

The upper end of inner tubular wall 44 is closed by a disk to form a closed or upper surface 45, which is pierced by a working component passage hole 48. The entire closed tailpiece assembly 14, with passage hole 48, is fixed, preferably by J threads 15, to the lower end of the bellows 12. Passage hole 48 is sufficiently large so that no contact is made with the drill bit 50, and thus no rotary motion is imparted to the debris catcher 10. Passage hole 48 is typically 1¼ inch in diameter. However, since some working components 4 are considerably smaller than this, I provide a centering disk 64 which may be snap fit into passage hole 48, to close down the diameter of the hole to typically 9/16 inch.

I then seal off and enclose the working component 4, for illustration drill bit 50, by providing, as an interfitting component of tailpiece 14, a captive, freely rotating spinner disk 60 which is shaped, as a tubular cylindrical disk, to match the inner shape of tailpiece 14, and which forms a rotatable inner wall of the chip chamber 40. Spinner disk 60 covers the closed upper surface 45, extends downward over inner tubular wall 44, and then extends out to at least cover the base disk 46; it may optionally extend up to cover a portion of the outer wall 42. Spinner disk 60 is retained in its position against upward movement within tailpiece 14 by its radial outer end 61 which is captive in a space 63 between the bottom of the bellows 12 and the tailpiece bottom disk 46.

In the top center of spinner disk 60, centered over the passage hole 48, I provide a working component or Bit receiving slot 62 which forms a slip fit seal to the working component 4 of the tool 5.

Bit receiving slot 62 is preferably formed as an upward pyramidal projection in the center of spinner disk 60, the pyramidal shape aiding in the centering and insertion of drill bit 50. Within this projection, bit receiving slot 62 may be a cross-cut slot, either as a slit or a hole within the material forming spinner disk 60. In any event, bit receiving slot 62 should be of a sufficiently tight fit over any conceivable working component 4 so as to form a sealing fit over working component 4, to prevent the escape of dusts.

Inner tubular wall 44 is sized so as to fit over, but not contact or rub against, a standard drill chuck 52 on a powered rotary drill 5. Preferably the length of inner tubular wall 44 is such that spinner disk 60 and bit receiving slot 62 are supported substantially level with screw thread 15, where tailpiece 14 and bellows 12 are joined.

Inasmuch as spinner disk 60 should be able to rotate freely with respect to tailpiece 14, it is preferable that spinner disk 60 be made of a plastic which has a low coefficient of friction in direct contact with the material chosen for the construction of at least tailpiece 14 or of the entire bellows. In either case, spinner disk 60 may rotate freely with the operating portion of the tool 5, while the safety debris catcher 10 does not rotate at all. It is not necessary that spinner disk 60 lock to or rotate synchronously with the working component 4, and with some tools such as stud guns, there is no rotation; however spinner disk 60 is free to rotate, and this will produce a centrifugal action which helps move captured debris away from the working component 4 down into the chip chamber 40.

In operation, when the seating or sealing surface 30 of the safety debris catcher 10 is seated against the surface in operation, the safety debris catcher 10 does not rotate, although it contains a rotating drill bit 50. The chip chamber 40 encloses the drill bit 50; normally drill bit 50 slips within spinner disk 60. If bit breakage or debris jams the drill bit 50, then only spinner disk 60 rotates, not the entire debris catcher 10.

The safety debris catcher 10 may be readily and easily connected or disconnected to and from the operating tool 5 simply by inserting or withdrawing the drill bit 50 or other working component 4 through the bit receiving slot 62 within the spinner disk 60.

When the drill bit 50 is so inserted within the safety debris catcher 10, the safety debris catcher 10 placed sealingly against a surface and drilling commenced. The operation of the drill will produce a large quantity of fine debris which will fall into the space interior to the debris catcher 10. Especially when the debris catcher 10 is in an upward facing position such as drilling overhead, this debris will fall into base area around the sleeve 14. It has been found that the rotation of the spinner disk 60 coaxially with the drill bit 50 forms a centrifugal effect which entraps the debris within the safety debris catcher 10, throwing it away from the drill bit 50 into the chip chamber 40, pulling the debris away from the working component 4 so as to prevent clogging or dust catching which might otherwise tend to jam or wear the debris catcher 10.

It is understood that the debris catcher 10 may be safely connected to and used with all types of rotating power operated tools where it is desired to catch debris and dust, thereby protecting the operator from working dust and debris and preventing them from falling onto the premises, the occupant, and the equipment or furniture where the operating tool is being used.

While for the purposes of disclosure, the improved safety debris catcher 10 has been illustrated on and in use with a rotating electric drill, it may be used with any and all construction tools having a rotating bit or member in which debris or dust is created or formed while the tool is in use. Thus the tool is equally suitable for use with drills, routers, or small rotary sanders. While a drill bit 50 has been used for illustration of the invention, the debris catcher 10 is equally adaptable to any working component 4.

Accordingly, the present invention is well suited and adapted to obtain the objects and ends and has the features and advantage mentioned as well as providing significant improvement over the safety debris catcher in my prior patent U.S. Pat. No. 4,955,984.

While present preferred embodiments have been given for the purpose of disclosure, changes and modifications thereto may be made which are within the spirit of the invention as defined by the scope of the appended claims.

What is claimed is:

1. A safety debris catcher or a rotary tool having a rotating working component, comprising:
    a resilient, tubular, sleeve-like bellows having a sleeve at its inner end and a debris collector at its outer end;
    the bellows being compressible axially and fitting around the working component of the tool;
    a non-rotating tailpiece connected to said bellows forming a chip chamber adapted to enclose the working component;
    said chip chamber having an annular tubular collecting space axially disposed about a portion of the rotating component;
    the chip chamber having an internal portion rotatably connected to said working component.

2. The safety debris catcher of claim 1 wherein the internal portion comprises:
    a freely rotatable internal tubular disk covering at least a portion of the interior of said chip chamber;
    said tubular disk being slip fit sealed to said working component.

3. The safety debris catcher of claim 1 wherein the chip chamber further comprises:
    an annular tubular structure having coaxial inner and outer vertically extending tubular walls;
    said tubular walls being enclosed by a base disk forming an annular surface between said inner tubular wall and said outer tubular wall at a bottom forming a closed chip receiving area;
    said inner wall being extended inwardly at the top by a disk extending radially inward from said inner wall, said annular surface having therein a working component receiving opening;
    a rotatable tubular disk contained within said tubular structure, covering at least a portion of the coaxial inner wall and said upper annular surface;
    said tubular disk being slip fit connected to said working component.

4. The safety debris catcher of claim 3 wherein said tubular disk further comprises:
    a freely rotating disk extending over said upper annular surface,
    extending downward covering said inner wall and extending outward to cover at least a part of said closed bottom.

5. The safety debris catcher of claim 3 where said tubular disk further comprises:
    a pyramidal projection over said component receiving opening;
    a bit receiving slit within said pyramidal extension.

6. In a safety debris catcher for a rotatable apparatus having a rotating working component, comprising in combination:
    a resilient, tubular, sleeve-like bellows having a sleeve at its inner end and a debris collector at its outer end;
    the bellows being compressible axially, having substantially constant diameter and fitting closely around the rotating component of the apparatus;
    the debris collector extending outwardly from the outer end of the bellows and having an outer seating surface adapted to seat against a surface of a wall, ceiling, floor or construction member;
    the bellows extending a majority of the axial distance of the debris collector;
    the improvement comprising:
    a tubular chip chamber fixedly connected to the lower end of the bellows;
    a rotating spinner disk interior to said chip chamber, sealingly connected to the working component of the apparatus;
    said spinner disk being an interfitting portion rotatably covering a portion of the inner surface of the tubular chip chamber, whereby debris from the working component is urged away from the working component into the chip chamber.

* * * * *